Dec. 2, 1930. J. B. D. L. CHARDARD 1,783,355
PORTABLE HEAT EXCHANGING APPARATUS
Filed July 28, 1927
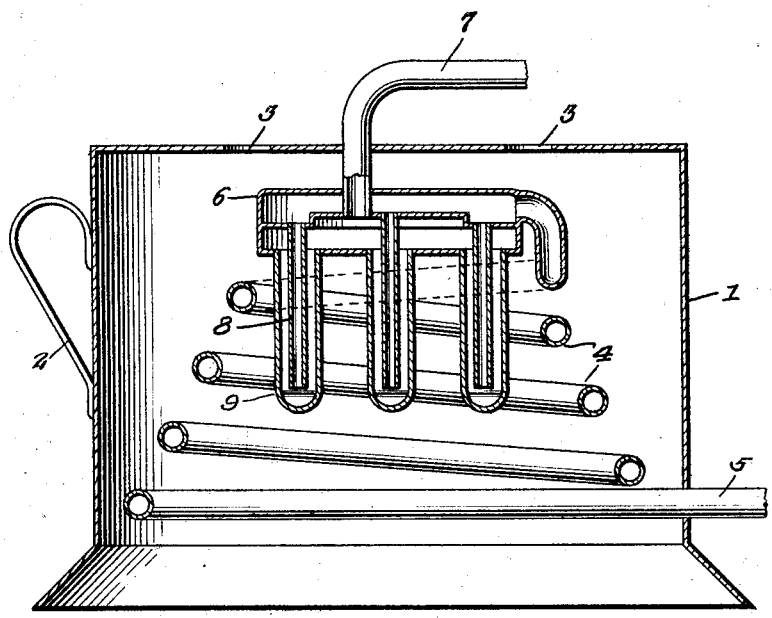
INVENTOR.
Jean Baptiste Dominique Leon Chardard,
BY
ATTORNEY.

Patented Dec. 2, 1930

1,783,355

UNITED STATES PATENT OFFICE

JEAN BAPTISTE DOMINIQUE LÉON CHARDARD, OF PARIS, FRANCE, ASSIGNOR TO RISLER CORPORATION OF AMERICA, OF KANSAS CITY, MISSOURI, A CORPORATION OF DELAWARE

PORTABLE HEAT-EXCHANGING APPARATUS

Application filed July 28, 1927, Serial No. 209,117, and in France July 28, 1926.

My invention relates to heat exchanging apparatus and particularly to apparatus for changing the temperature of a continuous liquid stream.

An object of my invention is to provide portable apparatus which may be used in conjunction with an ordinary stove or a pail of ice to heat or cool a small stream of water or other liquid.

The invention will be readily understood from a consideration of the accompanying drawing in which the figure is a central vertical sectional view of heat exchanging apparatus, illustrating one form of the invention.

A metallic case, 1, fitted with a handle, 2, and ventilating holes in the top, 3, contains a tubular coil of suitable material, preferably a heat conducting metal such as copper. Water or other liquid may be introduced into this coil through an inlet conduit, 5. A liquid so introduced passes up the coil, 4, through the heat exchanging apparatus, 6, and out through the discharge conduit, 7. The apparatus 6 includes a horizontal intake manifold communicating with the coil, tubes 8 communicating with the manifold and depending in tubes or housings 9 having open upper ends communicating with an outlet manifold to which the discharge conduit is connected. It will be seen that in the heat exchanging apparatus 6 the liquid first passes down through the central tubes, 8, and then up through the outer tubes, 9.

If this apparatus is placed over any suitable source of heat and a liquid passed through the apparatus the liquid will be heated quickly and to a high temperature. Likewise, if the apparatus be placed in a cooling mixture any liquid passed through it will be cooled.

What I claim and desire to secure by Letters Patent is:

1. Heat exchanging apparatus including a coil, a discharge conduit, intake and outlet manifolds communicating respectively with the coil and discharge conduit, return passageways communicating respectively with the intake and outlet manifolds and depending therefrom, and a heat confining case enclosing the coil, the manifolds and the return passageways.

2. Heat exchanging apparatus including a coil, an intake manifold connected with the coil, an outlet manifold having a discharge conduit, primary tubes leading from the intake manifold, secondary tubes housing the primary tubes and communicating with the outlet manifold, and a heat confining case enclosing the coil, the manifolds and said tubes.

3. Heat exchanging apparatus including a coil, a horizontal intake manifold connected with the coil, a horizontal outlet manifold below the inlet manifold, return tubes depending from and communicating with the outlet manifold, tubes leading from the intake manifold into the return tubes, a discharge conduit leading from the outlet manifold, and a heat confining case enclosing the coil, the manifolds and the tubes.

In testimony whereof I affix my signature.

JEAN BAPTISTE DOMINIQUE LÉON CHARDARD.